(12) United States Patent
Hsieh et al.

(10) Patent No.: US 7,834,111 B2
(45) Date of Patent: Nov. 16, 2010

(54) TERMINATING AGENT FOR ANIONIC POLYMERIZATION

(75) Inventors: Chi-Chen Hsieh, Kaohsiung County (TW); Chih-Kuang Tsai, Kaohsiung County (TW); Tsung-Yuan Wang, Kaohsiung County (TW)

(73) Assignee: TSRC Corporation, Kaohsiung County (TW)

( * ) Notice: Subject to any disclaimer, the term of this patent is extended or adjusted under 35 U.S.C. 154(b) by 273 days.

(21) Appl. No.: 11/971,309

(22) Filed: Jan. 9, 2008

(65) Prior Publication Data

US 2008/0214760 A1      Sep. 4, 2008

Related U.S. Application Data

(60) Provisional application No. 60/879,717, filed on Jan. 9, 2007.

(51) Int. Cl.
  *C08F 2/38*   (2006.01)
  *C08F 4/48*   (2006.01)
  *C07H 3/06*   (2006.01)

(52) U.S. Cl. .................. 526/84; 526/173; 528/501; 528/502 A; 528/502 D

(58) Field of Classification Search ........... 536/1.11, 536/2, 56, 123, 13; 526/84, 173; 528/501, 528/502 A, 502 D
See application file for complete search history.

(56) References Cited

U.S. PATENT DOCUMENTS 2,719,179 A * 9/1955 Mora et al. ............... 536/123
2009/0043055 A1 * 2/2009 Luo et al. .................. 526/66

OTHER PUBLICATIONS

Enholm et al, Free Radical Allyl Transfers Utilizing . . . Polystyrene and Carbohydrate Scaffold Supports, Organic Letters, 2000, 2(21), 3355-3357.*

* cited by examiner

*Primary Examiner*—Fred M Teskin
(74) *Attorney, Agent, or Firm*—Volpe and Koenig P.C.

(57) ABSTRACT

A terminating agent and a method for preparing an anionic polymer are provided. The terminating agent includes a carbohydrate, which is a solid substantially insoluble in a solvent and is used for terminating an anionic polymerization of a polymer. Another aspect of the method includes steps which provide an initiator for initiating an anionic polymerization, adding a terminating agent for terminating the anionic polymerization and forming a complex, wherein the terminating agent is a carbohydrate, and an alkali metal ion is removed by a solid-liquid separation process.

17 Claims, No Drawings

TERMINATING AGENT FOR ANIONIC POLYMERIZATION

CROSS REFERENCE TO RELATED APPLICATIONS

The present application claims priority to U.S. Provisional App. No. 60/879,717 for "Terminating Agent for Anion Polymerization" filed Jan. 9, 2007, the contents of which are incorporated herein by reference in their entirety.

FIELD OF THE INVENTION

The present invention relates to a terminating agent for anionic polymerization, in particular to a terminating agent for removing the alkali metal ion in an anionic polymer solution through a solid-liquid separation.

BACKGROUND OF THE INVENTION

Anionic polymerization is a common technology used in producing plastic materials, and elastomers, and the polymers made by anionic polymerization also have various commercial applications, such as tire and other industrial elastomers, adhesives, sealants and coatings.

With regard to the anionic polymerization, an initiator is required for initiating the polymerization of monomer. It is known that most common initiators have some metal components, such as an alkali metal ion, an alkaline-earth metal ion and the compounds thereof. However, the physical properties and thermal stability of the polymers that are produced by using an initiator containing metal ions will be affected by the remaining metal ions. Therefore, some specific methods and complicated procedures are required in order to remove the metal ions during the polymerization.

In order to obtain a polymer with an uniform molecular weight distribution, a terminating agent is added into the anionic polymerization for terminating the reaction. A traditional terminating agent having an alcohol group, a halogen group or an ester group may completely terminate the anionic polymerization, however it forms a complex with the alkali metal ion that cannot be separated from the anionic polymer solution. Further, the transparency of the polymer made by anionic polymerization will be reduced even if the polymer solution goes through the separation process. Besides, the final product or the by-product of the complex formed of the anionic polymerization and the terminating agent having alcohol groups, halogen group or ester groups often exists in the solvent and become a poison. After the recovery procedure of the solvent, the poison remaining in the waste water will cause a higher chemical oxygen demand (COD) or biochemical oxygen demand (BOD). Since the traditional terminating agents are liquids and will mix with the solvent used in the polymerization, it is not economical to consume extra energies for removing the terminating agent.

In view of the above, the inventors developed a terminating agent for anionic polymerization based on their experience in studying the polymerization for over a period of time. The terminating agent of the present invention not only has an effect of terminating the anionic polymerization, but also has a low solubility in common solvent used in the polymerization. Thus, the complex formed of the terminating agent and the alkali metal ion can be separated easily from the polymer without complicated separation steps. The separation of the present invention will not affect the transparency of the polymer, moreover, the terminating agent of the present invention is a natural and harmless material that will not contaminate the environment so that make the product more environmentally friendly than the traditional terminating agents. The summary of the present invention is described below.

SUMMARY OF THE INVENTION

It is an object of the present invention to provide a carbohydrate as a terminating agent for an anionic polymerization. The terminating agent forms a complex with the alkali metal ion in the anionic polymer solution and has a character of low solubility in the common solvent used in the anionic polymerization. Thus, the complex can be removed from the anionic polymer solution through a solid-liquid separation process.

Moreover, another advantage of using this terminating agent of the present invention is that it keeps the transparency and good color stability during the processing process of the polymer.

Further, this terminating agent of the present invention is a natural and harmless material preventing contamination of the environment so that make it more environmentally friendly than the traditional terminating agents.

In order to achieve the above object, the present invention provides a terminating agent for terminating an anionic polymerization of a polymer. The terminating agent comprises a carbohydrate and forms a complex with an alkali metal ion in the polymer.

The carbohydrate of the present invention is consisted of at least one of the following groups, a monosaccharide, a disaccharides, an oligo-saccharides and a polysaccharides. Furthermore, the monosaccharide is at least one selected from a group consisting of a glucose, a fructose and a galactose, the disaccharide is at least one selected from a group consisting of a sucrose, a maltose and a lactose, the oligo-saccharides is at least one selected from a group consisting of a raffinose, a galacto-oligo and a fructo-oligo, and the polysaccharides is at least one selected from a group consisting of a starch, a dextrin, a pectin, a gum, a cellulose, a wood powder and an inulin.

Preferably, the alkali metal ion is one selected from a group consisting of a lithium ion, a sodium ion and a potassium ion.

According to one preferred embodiment of the present invention, the complex is separated from the polymer through a solid-liquid separation process for removing the alkali metal ion. Preferably, the solid-liquid separation process is one selected from an unit operation consisting of a centrifugation, a filtration, a film separation, a decantation, a precipitation, a flotation, a distillation and a method of separation of solid and liquid.

It is another aspect of the present invention to provide a terminating agent comprising a carbohydrate, which is a solid substantially insoluble in a solvent and is used for terminating an anionic polymerization of a polymer.

The carbohydrate of in the present invention is consisted of at least one of the following groups, a monosaccharide, a disaccharides, an oligo-saccharides and a polysaccharides. Furthermore, the monosaccharide is at least one selected from a group consisting of a glucose, a fructose and a galactose, the disaccharide is at least one selected from a group consisting of a sucrose, a maltose and a lactose, the oligo-saccharides is at least one selected from a group consisting of a raffinose, a galacto-oligo and a fructo-oligo, and the polysaccharides is at least one selected from a group consisting of a starch, a dextrin, a pectin, a gum, a cellulose, a wood powder and an inulin.

Preferably, the carbohydrate is included in one selected from a group consisting of a specific polymer made of a bio-based material, a polymer having repeated carbohydrate units, and a polymer mixed with the carbohydrate and insoluble in the hydrocarbon solvent.

It is a further aspect of the present invention to provide a method for preparing a polymer made by anionic polymerization. The method comprises steps of providing an initiator for initiating an anionic polymerization, adding a terminating agent for terminating the anionic polymerization and forming a complex, wherein the terminating agent is one of a carbohydrate and a specific polymer having the carbohydrate, and removing the complex.

According to the present invention, the polymer is one of a homopolymer and a copolymer, and has a structure selected from a group consisting of a linear structure, a multi-arm structure, a branched structure and a star structure.

Preferably, the copolymer is selected from a group consisting of a block copolymer, a random copolymer and a taper block copolymer.

According to the present invention, the polymer made by anionic polymerization has a molecular weight ranged from 60,000 to 1,500,000 Dalton. Preferably, the polymer made by anionic polymerization has a molecular weight ranged from 60,000 to 600,000 Dalton.

Preferably, the initiator comprises an organic alkali metal. In the preferred embodiment, the initiator is n-butyl lithium.

The carbohydrate of in the present invention is consisted of at least one of the following groups, a monosaccharide, a disaccharides, an oligo-saccharides and a polysaccharides. Furthermore, the monosaccharide is at least one selected from a group consisting of a glucose, a fructose and a galactose, the disaccharide is at least one selected from a group consisting of a sucrose, a maltose and a lactose, the oligo-saccharides is at least one selected from a group consisting of a raffinose, a galacto-oligo and a fructo-oligo, and the polysaccharides is at least one selected from a group consisting of a starch, a dextrin, a pectin, a gum, a cellulose, a wood powder and an inulin.

Preferably, specific polymer having the carbohydrate is one selected from a group consisting of a bio-based material, a polymer having repeated carbohydrate units and a polymer mixed with the carbohydrate and insoluble in a hydrocarbon solvent.

Preferably, the complex is removed through a solid-liquid separation process to obtain the polymer, and the solid-liquid separation process is one selected from an unit operation consisting of a centrifugation, a filtration, a film separation, a decantation, a precipitation, a flotation, a distillation and a method of separation of solid and liquid.

Other objects, advantages and efficacies of the present invention will be described in detail below taken from the preferred embodiments.

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Example I

The Terminating Agent for Anionic Polymerization

The present invention provides a carbohydrate as terminating agent, it can terminate the reaction of an anionic polymerization. According to the present embodiment, the terminating agents are monosaccharides, disaccharides and polysaccharides, and the amounts are shown in Table 1. Referring to Table 1, the monosaccharide is glucose, the disaccharide is sucrose, and the polysaccharides is starch. Accordingly, among the carbohydrate, all of the monosaccharides, the disaccharides, the oligo-saccharides and the polysaccharides can serve as the terminating agent of the present invention. Moreover, the monosaccharides further comprise fructose and galactose, the disaccharides further comprises maltose and lactose, the oligo-saccharides further comprises raffinose, galacto-oligo and fructo-oligo, and the polysaccharides further comprises dextrin, pectin, gum, cellulose, wood powder and inulin. In addition to the above-mentioned carbohydrate, the present invention has an alternative form of the terminating agent, a specific polymer having the carbohydrate. The specific polymer having the carbohydrate is one selected from a group consisting of a bio-based material, a polymer having repeated carbohydrate units and a polymer mixed with the carbohydrate and insoluble in hydrocarbon solvents.

In another aspect, the present invention provides a terminating agent for anionic polymerization, which is a carbohydrate or a specific polymer having the carbohydrate. The terminating agent herein is substantially insoluble in hydrocarbon solvents commonly used in the anionic polymerization, such as the organic alkanes and the aromatic hydrocarbons. As a result, the terminating agent forms a complex with the alkali metal ion within the anionic polymer solution in the chain end of the polymer, and the complex can be separated from the anionic polymer through a solid-liquid separation process.

Example II

The Preparation of the Anionic Polymer

The embodiment herein illustrates a method for preparing a polymer made by anionic polymerization using carbohydrates as terminating agent.

Firstly, a reactor is washed with cyclohexane followed by a nitrogen purge. Secondly, 930 g of cyclohexane is added to the reactor and then the temperature of the reactor is heated to 50° C. In the present embodiment, styrene is the first monomer and butadiene is the second monomer. Under the balanced temperature, 46.5 g of styrene is charged into the reactor with pressurized nitrogen, and a pre-determined amount of 15% n-butyl lithium is added simultaneously as an initiator for anionic polymerization. After 20 minutes, 12.2 g of butadiene is added into the reactor and the anionic polymerization is continued. 10 minutes later, another 46.5 g of styrene is added into the reactor for continuing the polymerization reaction. After 20 minutes, a pre-determined amount of terminating agents as shown in Table 1 are added into the reactor and stirred thoroughly for 10 minutes to terminate the polymerization reaction.

After the anionic polymerization is terminated, the product of the reaction, a solution of the anionic polymer, is pressed into a filtration equipment under a pressure of 0.5 kgf/cm$^2$ for removing the lithium from the polymer solution by a solid-liquid separation process. In the present embodiment, a 0.45 μm or a 1 m filter is used as the solid-liquid separation process. After the filtration, the solution of the anionic polymer is heated in an oven at 100° C. for 1 hr and then taken out for analyzing the amount of lithium by an atomic absorption spectrophotometer.

The initiator of the present embodiment is n-butyl lithium, however, a compound containing other alkali metal ions can serve as the initiator, i.e. the sodium ion and the potassium ion. Besides, any chemical industrial method for solid-liquid separation process, can be used in the present invention, such as centrifugation, filtration, film separation, decantation, precipitation, extraction, flotation, distillation and other methods separating a solid from a liquid.

TABLE 1

| Terminating agent | methanol | starch | sucrose | glucose | cellulose A | cellulose B |
|---|---|---|---|---|---|---|
| Amount of 15% n-butyl lithium (g) | 1.5 | 1.55 | 1.42 | 1.46 | 1.5 | 1.35 | 1.45 |
| Amount of terminating agent(g) | 2.0 | 5.0 | 0.5 | 6 | 5 | 1.0 | 1.2 |
| Molecular weight ($\times 10^4$) | 6.5 | 6.1 | 6.7 | 6.7 | 6.3 | 6.8 | 6.2 |
| Molecular weight distribution | 1.03 | 1.03 | 1.04 | 1.06 | 1.05 | 1.04 | 1.04 |
| Filter pore size (μm) | 0.45 | 0.45 | 1 | 0.45 | 1 | 1 | 0.45 |
| Residue of lithium (ppm) | 138 | 0.16 | 0.95 | 2.21 | 4.75 | 1.73 | 0.33 |
| Solubility in cyclohexane | soluble | Almost insoluble | Almost insoluble | Almost insoluble | Almost insoluble | Almost insoluble | Almost insoluble |

Table 1 shows the results of the residue of lithium metal in the polymer made by anionic polymerization by using different terminating agents. As shown in Table 1, the lithium concentration in the polymer is 138 ppm when using methanol as a terminating agent. Methanol is a common terminating agent, however, it forms a complex with the lithium metal ion and the complex cannot be easily removed from the polymer by a filter. In the present invention, the starch, the sucrose, the glucose and the cellulose are used as terminating agents, the complexes of these carbohydrates and lithium ion can be held up by the filter. According to Table 1, the concentration of lithium is 0.16 ppm by using the starch as a terminating agent, the concentration of lithium is 0.33 ppm by using B (Bulk Density: 0.15 g/cm$^3$) as a terminating agent when the anionic polymer solution is filtrated through a 0.45 μm filter. Additionally, the concentration of lithium is 0.95 ppm by using the starch as a terminating agent, and the concentration of lithium is 1.73 ppm by using A (Bulk Density: 0.22 g/cm$^3$) as a terminating agent when the anionic polymer solution is filtrated through a 1 μm filter. Other carbohydrate terminating agents perform better than methanol of reducing the remaining lithium. Based on the above reasons, it is known that carbohydrate is an effective terminating agent of anionic polymerization, it not only determines the polymerization but also makes the alkali metal ions removable from the polymer easily without affecting the transparency of the polymer.

According the steps described in the above embodiment, the anionic polymer is a copolymer composed of two monomers, which has an alignment selected from a group consisting of a block, a random and a taper block. Alternatively, according to the actual needs, the polymer may be a homopolymer while it is composed of one monomer. According to the present invention, the polymer is one of a homopolymer and a copolymer, and has a structure selected from a group consisting of a linear structure, a multi-arm structure, a branched structure and a star structure. The polymer made by anionic polymerization has a molecular weight ranged from 60,000 to 1,500,000 Dalton. Preferably, the polymer made by anionic polymerization has a molecular weight ranged from 60,000 to 600,000 Dalton.

To summarize, the present invention provides a terminating agent for anionic polymerization. By using the terminating agent, the alkali metal ions can be removed from the anionic polymer solution through a solid-liquid separation process. Moreover, the polymer obtained by adding the terminating agent of the invention keeps the transparency after removing the alkali metal ion. As a result, the above-mentioned polymer still has a stable physical property and it can further reduce the contamination in the solvent or waste water system.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for terminating an anionic polymerization of a polymer, comprising:
   providing a terminating agent;
   preparing the polymer by the anionic polymerization; and
   terminating the anionic polymerization by adding the terminating agent into the polymer,
   wherein the terminating agent forms a complex with an alkali metal ion in the polymer, and the terminating agent includes one selected from a group consisting of a monosaccharide, a disaccharide, an oligo-saccharide and a polysaccharide.

2. A method as claimed in claim 1, wherein the monosaccharide is at least one selected from a group consisting of a glucose, a fructose and a galactose, the disaccharide is at least one selected from a group consisting of a sucrose, a maltose and a lactose, the oligo-saccharides is at least one selected from a group consisting of a raffinose, a galacto-oligo and a fructo-oligo, and the polysaccharides is at least one selected from a group consisting of a starch, a dextrin, a pectin, a gum, a cellulose, a wood powder and an inulin.

3. A method as claimed in claim 1, wherein the alkali metal ion is one selected from a group consisting of a lithium ion, a sodium ion and a potassium ion.

4. A method as claimed in claim 1, wherein the complex is separated from the polymer through a solid-liquid separation process which removes the alkali metal ion.

5. A method as claimed in claim 4, wherein the solid-liquid separation process is one selected from a group consisting of a centrifugation, a filtration, a film separation, a decantation, a precipitation, an extraction, a flotation, a distillation and a method of separation of solid and liquid.

6. A method for terminating an anionic polymerization of a polymer, comprising:
  providing a terminating agent, wherein the terminating agent is a solid substantially insoluble in a solvent;
  preparing the polymer by the anionic polymerization; and
  terminating the anionic polymerization of the polymer by adding the terminating agent into the polymer, wherein the terminating agent includes one selected from a group consisting of a monosaccharide, a disaccharide, an oligo-saccharide and a polysaccharide.

7. A method as claimed in claim 6, wherein the monosaccharide is at least one selected from a group consisting of a glucose, a fructose and a galactose, the disaccharide is selected from at least one of a group consisting of a sucrose, a maltose and a lactose, the oligo-saccharides is at least one selected from a group consisting of a raffinose, a galacto-oligo and a fructo-oligo, and the polysaccharides is at least one selected from a group consisting of a starch, a dextrin, a pectin, a gum, a cellulose, a wood powder and an inulin.

8. A method as claimed in claim 6, wherein the terminating agent is included in one selected from a group consisting of a polymer made of a bio-based material, a polymer having repeated carbohydrate units, and a polymer mixed with the terminating agent and insoluble in the solvent being a hydrocarbon solvent.

9. A method for preparing a polymer comprising steps of:
  (a) providing an initiator for initiating an anionic polymerization;
  (b) adding a terminating agent for terminating the anionic polymerization and forming a complex, wherein the terminating agent includes one selected from a group consisting of a monosaccharide, a disaccharide, an oligo-saccharide, a polysaccharide and a polymer having a carbohydrate; and
  (c) removing the complex.

10. A method as claimed in claim 9, wherein the polymer is one of a homopolymer and a copolymer, and has a structure selected from a group consisting of a linear structure, a multi-arm structure, a branched structure and a star structure.

11. A method as claimed in claim 10, wherein the copolymer is selected from a group consisting of a block copolymer, a random copolymer and a taper block copolymer.

12. A method as claimed in claim 9, wherein the polymer made by anionic polymerization has a molecular weight ranged from 60,000 to 1,500,000 Dalton.

13. A method as claimed in claim 12, wherein the polymer made by anionic polymerization has a molecular weight ranged from 60,000 to 600,000 Dalton.

14. A method as claimed in claim 9, wherein the initiator comprises an organic alkali metal.

15. A method as claimed in claim 9, wherein the monosaccharide is at least one selected from a group consisting of a glucose, a fructose and a galactose, the disaccharide is at least one selected from a group consisting of a sucrose, a maltose and a lactose, the oligo-saccharides is selected from at least one of a group consisting of a raffinose, a galacto-oligo and a fructo-oligo, and the polysaccharides is at least one selected from a group consisting of a starch, a dextrin, a pectin, a gum, a cellulose, a wood powder and an inulin.

16. A method as claimed in claim 9, wherein the polymer having the carbohydrate is one selected from a group consisting of a bio-based material, a polymer having repeated carbohydrate units and a polymer mixed with the carbohydrate and insoluble in a hydrocarbon solvent.

17. A method as claimed in claim 9, wherein the complex is removed through a solid-liquid separation process to obtain the polymer, and the solid-liquid separation process is one selected from a group consisting of a centrifugation, a filtration, a film separation, a decantation, a precipitation, an extraction, a flotation, a distillation and a method of separation of solid and liquid.

* * * * *